United States Patent
Ernst

[15] 3,642,171
[45] Feb. 15, 1972

[54] APPARATUS FOR INTRODUCING ADDITIVES INTO LIQUIDS

[72] Inventor: Franz Ernst, Aglasterhausen, Germany

[73] Assignee: Chemie Und Filter GmbH Verfahrenstechnik KG, Heidelberg, Germany

[22] Filed: May 28, 1969

[21] Appl. No.: 828,462

[30] Foreign Application Priority Data

May 31, 1969 Germany ................. P 17 67 659.4

[52] U.S. Cl. ......................... 222/59, 137/98, 222/57, 222/133
[51] Int. Cl. ........................................... B67d 5/08
[58] Field of Search ............ 137/99, 98, 99.5, 565; 222/14, 222/57, 59, 71, 52, 133; 318/130; 73/229, 198; 317/151

[56] References Cited

UNITED STATES PATENTS

| | | | |
|---|---|---|---|
| 2,317,166 | 8/1939 | Abrams | 318/130 UX |
| 1,720,326 | 7/1929 | Halstead et al. | 137/99 |
| 3,239,722 | 3/1966 | Menkis | 317/151 |

FOREIGN PATENTS OR APPLICATIONS

| | | | |
|---|---|---|---|
| 105,849 | 2/1898 | Germany | 222/133 |
| 1,088,313 | 10/1967 | England | 222/57 |

Primary Examiner—Stanley H. Tollberg
Assistant Examiner—James M. Slattery
Attorney—Michael S. Striker

[57] ABSTRACT

Apparatus for introducing an additive into a stream of liquid comprises a pipeline which conveys the liquid at a variable rate of flow, a flowmeter whose chamber communicates with the pipeline and accommodates a rotor rotated by liquid in the pipeline at a speed which is a function of the rate of liquid flow to thereby produce signals at a frequency which is indicative of such speed, and a pump which discharges into the chamber a unit quantity of additive in response to each signal whereby the additive is mixed with liquid in the chamber before it enters the main stream of liquid in the pipeline.

7 Claims, 4 Drawing Figures

PATENTED FEB 15 1972 3,642,171

Inventor:
FRANZ ERNST

APPARATUS FOR INTRODUCING ADDITIVES INTO LIQUIDS

BACKGROUND OF THE INVENTION

The present invention relates to apparatus for introducing chemicals or other additives into liquids, and more particularly to an apparatus for introducing additives into flowing liquids at a rate which varies proportionally with changes in the quantity of liquid flow per unit of time.

It is already known to admit measured amounts of phosphates or other chemicals into drinking water for the purpose of preventing deposition of calcium. Admission of measured amounts of additives into flowing liquids at a rate which varies with the rate of liquid flow is also desirable for many other purposes, for example, to admit dyestuffs. As a rule, such apparatus employ a flowmeter which measures the rate of liquid flow and produces signals at a frequency which varies as a function of changes in flow. Such flowmeters are capable of regulating the admission of additives within any desired range, i.e., from zero to a maximum value. This insures that the percentage of an additive in a flowing liquid cannot exceed a given value which is selected to insure economy of operation, optimum effectiveness and/or to satisfy certain other requirements.

A drawback of presently known apparatus for admission of additives is that the pump or another supplying means which effects actual admission of additives introduces the additives in stepwise fashion, i.e., a unit quantity of additive is introduced into the main stream of liquid in response to each signal from the flowmeter. This results in excessive localized concentration of additive, especially if the rate of liquid flow is rather low so that the pump admits additives at relatively long intervals. Otherwise stated, the average rate of admission remains constant but the additive is not immediately distributed with a desired degree of uniformity.

SUMMARY OF THE INVENTION

An object of my invention is to provide an apparatus which is capable of introducing into a flowing liquid one or more additives in such a way that the average percentage of additive is maintained within a narrow range and that the additive is admitted without even temporary overconcentration in the flowing liquid.

Another object of the invention is to provide an improved connection between the flowmeter and the pump of an apparatus which is utilized to admit measured quantities of one or more additives into a flowing liquid.

A further object of the invention is to provide an apparatus wherein the additive is automatically diluted prior to entering the main stream of flowing liquid.

An additional object of the invention is to provide an apparatus wherein the flowmeter contributes to more uniform distribution of one or more additives in a flowing liquid.

The improved apparatus for introducing additives into flowing liquids comprises a pipeline or analogous conveying means for conveying a liquid at a variable rate of flow, flowmeter means installed in and defining a measuring chamber communicating with the pipeline, the flowmeter means comprising rotor means mounted in the measuring chamber and rotatable by liquid in the pipeline at a speed which is a function of the rate of liquid flow whereby the rotor means circulates at least a portion of the liquid in the measuring chamber, signal-generating means operative to produce signals at a frequency which is a function of rotational speed of the rotor means, and additive supplying means preferably including an electromagnetic pump operative to discharge directly into the measuring chamber a unit quantity of an additive in response to each signal so that the additive is admixed to the liquid in the measuring chamber before it enters the main liquid stream in the pipeline. The pump may be provided with one or more outlets whose discharge ends are preferably located close to the axis of the rotor means and preferably midway between an inport of the pipeline which supplies liquid to the measuring chamber and an outport of the pipeline which evacuates liquid from the measuring chamber.

The novel features which are considered as characteristic of the invention are set forth in particular in the appended claims. This improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
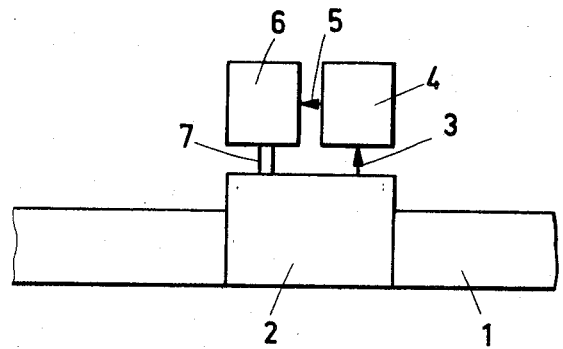
FIG. 1 is a diagrammatic view of an apparatus which embodies the present invention and which employs a propeller-type flowmeter and an electromagnetic pump.

The diagram of FIG. 1 shows a pipeline 1 which constitutes a liquid-conveying means and which accommodates a flowmeter 2. The pipeline 1 can be a main line or a branch of a main line, i.e., the flowmeter 2 can measure the rate of flow of an entire liquid stream or of a smaller stream which is diverted from the main stream. The flowmeter 2 produces signals which indicate the velocity of liquid flow in the line 1, and such signals are transmitted by a conductor 3 to a control unit 4 which transmits appropriate signals via conductor 5 to an electromagnetic pump 6. The outlet 7 of the pump 6 delivers into the flowmeter 2 unit quantities of an additive at a frequency which is a function of the velocity of liquid in the line 1.

Figure 2:
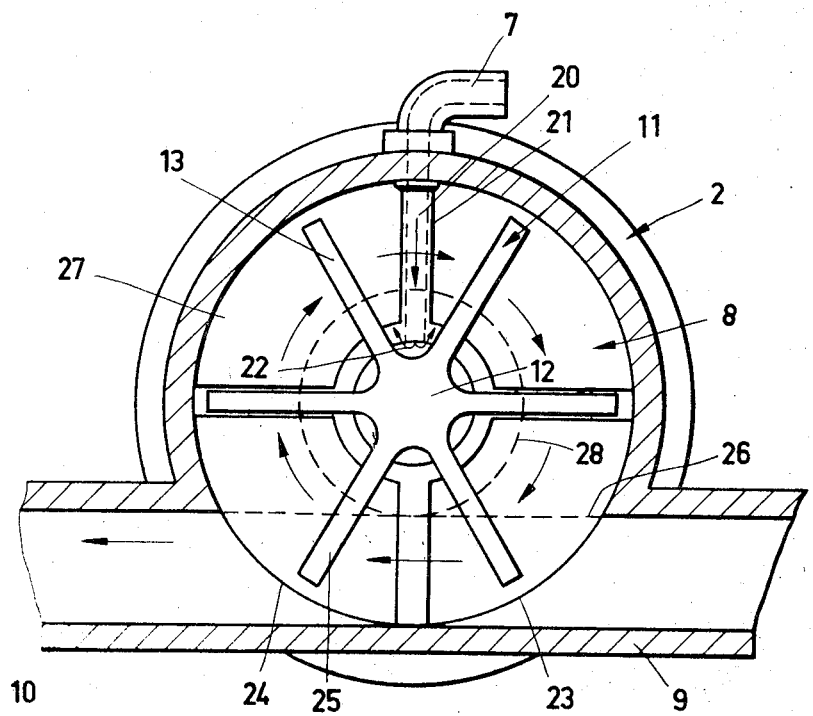
FIG. 2 is an enlarged sectional view of the flowmeter in a plane which is normal to the rotor axis.
Figure 3:
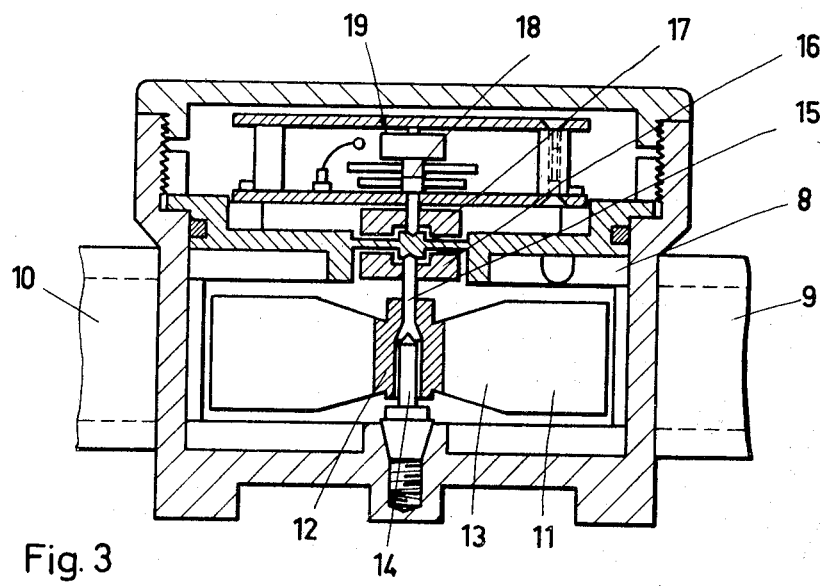
FIG. 3 is an enlarged axial sectional view of the flowmeter.

As shown in FIGS. 2 and 3, the flowmeter 2 is a propeller-type flowmeter and its housing defines a measuring chamber 8 receiving liquid by way of an import 9 and discharging liquid by way of an outport 10. The ports 9, 10 form part of the pipeline 1 and are tangential with reference to the chamber 8. This chamber accommodates a rotor or propeller 11 having a hub 12 and radially outwardly extending blades 13. The rotor 11 is rotatable on a fixed needle 14 and has a shaft 15 connected with a magnet 16. The magnet 16 cooperates with a magnet 17 located externally of the measuring chamber 8, i.e., the magnet 17 rotates with the magnet 16 and drives a shaft 18 which actuates a signal generator 19 once or more than once during each revolution of the magnet 17. Thus, the signal generator 19 produces signals at a frequency which is a function of rotational speed of the rotor 11.

The measuring chamber 8 communicates with the outlet 7 of the pump 6 which delivers unit quantities of an additive from a suitable source, not shown. The outlet 7 has a discharging portion 21 which is a rib of the flowmeter housing and is provided with a bore or passage 20 arranged to convey the additive to a discharge end 22 which is closely adjacent to the hub 12 of the rotor 11. As shown, the discharge end 22 where the outlet 7 admits additive into the chamber 8 is located exactly midway between the inport 9 and outport 10. The regions where the inport 9 admits liquid and the outport 10 receives liquid are respectively shown at 23 and 24.

The dimensions of the rotor blades 13 are selected in such a way that their outer portions 25 travel across the path of liquid from the region 23 to the region 24. As shown in FIG. 2, the major part of conveyed liquid flows from the inport 9, through the chamber 8 and into the outport 10 in a zone located below the broken line 26. A second portion of conveyed liquid enters the annular section 27 of the measuring chamber 8. That part of such second portion which flows outside of the broken line circle 28 (FIG. 2) leaves the section 27 after a single revolution; however, the liquid which fills the central section of the chamber 8 (within the circle 28) can complete one, two or more revolutions prior to entering the outport 10. Thus, the liquid which is admitted via inport 9 includes a first portion which flows directly into the outport 10, a second portion which completes one revolution in the radially outermost section of the measuring chamber 8, and a third portion which fills the central section of the chamber 8 and can dwell in the chamber 8 as long as or longer than the second portion.

The additive which enters the central section of the measuring chamber 8 by way of the passage 20 can be admixed to the third portion of the conveyed liquid and can circle with such third portion once or more than once before it enters the outport 10 of the pipeline 1. Consequently, the distribution of additive in the main stream of liquid takes place gradually. For example, if the additive is a phosphate solution and the liquid in the pipeline 1 is drinking water, the solution (whose specific weight is greater than the specific weight of water) is gradually propelled into the second portion of the liquid stream (in the radially outermost section of the measuring chamber 8) by centrifugal force and is distributed uniformly in the liquid which flows once around the axis of the rotor 11 to thereupon enter the outport 10. It will be seen that the additive which is admitted by the passage 20 per unit of time at a constant rate of liquid flow takes longer to become distributed in the liquid which fills and flows through the central and outermost sections of the measuring chamber 8. The rotor 11 performs the dual function of initiating the generation of signals at a frequency which is a function of the rate of liquid flow and of distributing unit quantities of additive in the chamber 8 before such additive enters the pipeline 1.

Figure 4:
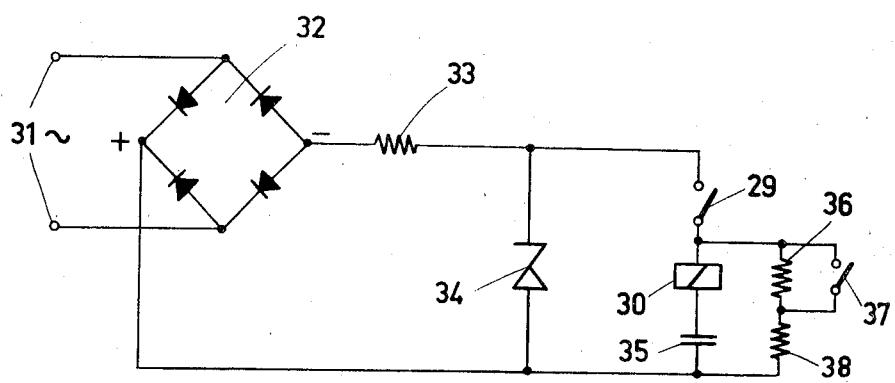
FIG. 4 is a circuit diagram of the electrical control unit which actuates the pump.

The signal generator 19 includes an electric switch 29 (FIG. 4) which is closed at a frequency varying as a function of changes in velocity of liquid that flows from the inport 9 to the outport 10. When the switch 29 closes, it energizes a pump relay 30 which completes the circuit of the pump 6 so that the latter delivers a unit quantity of additive by way of the outlet 7, its passage 20 and into the central section of the measuring chamber 8. FIG. 4 further shows a rectifier 32 which is connected with a source 31 of AC current. The rectifier 32 is in series with a resistor 33 and a Zener diode 34 which delivers a substantially constant potential. The diode 34 is connected in parallel with the switch 29 of the signal generator 19, with the pump relay 30 and with a capacitor 35. When the switch 29 is closed by the magnet 18, the capacitor 35 is charged and the relay 30 is energized immediately after closing, i.e., when a large current flows through the relay winding. The current strength thereupon decreases. When the switch 29 opens, the capacitor 35 discharges across the relay 30, a resistor 36 (which can be bridged by a switch 37) and a further resistor 38. The resistors 36, 38 are dimensioned in such a way that the current flowing in response to discharge of the capacitor 35 does not suffice to energize the relay 30 in response to opening of the switch 29. However, if the resistor 36 is bridged in response to closing of the switch 37, the current flowing in response to discharge of capacitor 35 suffices to energize the relay 30 and to cause the pump 6 to deliver a unit quantity of additive. Thus, the switch 37 constitutes a simple means for multiplying the output of the pump 6. The elements 32-38 constitute components of the control unit 4 shown in FIG 1.

An important advantage of such positioning of the outlet 7 that its discharge end 22 is located at least substantially midway between the inport 9 and outport 10 is that the direction of liquid flow in the pipeline 1 can be reversed without affecting the accuracy of the metering action. Also, a flowmeter wherein the discharge end 22 is located in a manner as shown in FIG. 2 can be mounted in a pipeline irrespective of the direction of liquid flow therein.

As a rule, the pump 6 is preferably designed to discharge a relatively small unit quantity of an additive in response to each signal from the signal generator 19. This is advisable in order to insure more uniform distribution of additive or additives in the flowing liquid. It is presently preferred to employ a pump which is capable of discharging at least 2,000 unit quantities of additive per hour. Many presently known electromagnetic pumps are suited for delivering additives at such frequency.

It is clear that the improved apparatus is susceptible of many modifications without departing from the spirit of the present invention. For example, the flowmeter 2 can be replaced by other types of flowmeters and the pump 6 can be replaced by any other pump which can discharge predetermined unit quantities of an additive in response to discrete signals. If the pump 6 is replaced with a hydraulically or pneumatically operated pump, the flow of a pressurized fluid which drives the pump is regulated by multiway valve means which opens and closes in response to signals from the control unit 4. The electromagnetic pump 6 may be of the type as described in 3.001.269 EXACTAMATIC.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In an apparatus for introducing additives into flowing liquids, a combination comprising a measuring chamber; conveying means for conveying a liquid at a variable rate of flow and including an inport which admits liquid to said chamber and an outport which evacuates liquid from said chamber, said chamber including a first section located between said inport and said outport and a second section; flowmeter means comprising rotor means mounted in said chamber and rotatable by liquid passing from said inport to said outport at a speed which is a function of the rate of liquid flow whereby the rotor means circulates at least a portion of the liquid through said second section of said chamber thereby filling said chamber with liquid, said rotor means comprising hub means located in said second section of said chamber, and signal-generating means operative to produce signals at a frequency which is a function of the rotational speed of said rotor means; and additive supplying means operative to discharge a unit quantity of an additive under pressure into the liquid in the second section of said chamber in response to each of said signals so that the additive is admixed to liquid in said chamber prior to entering said conveying means, said additive-supplying means comprising additive discharge outlet means having a discharge end adjacent to said hub means.

2. A combination as defined in claim 1, wherein said rotor means comprises substantially radial blades having outer portions extending into the first section of said chamber.

3. A combination as defined in claim 1, wherein said discharge end is located at least substantially midway between said inport and said outport.

4. A combination as defined in claim 1, wherein said additive-supplying means comprises an electromagnetic pump.

5. A combination as defined in claim 1, wherein said additive-supplying means is arranged to discharge into said chamber unit quantities of an additive at a frequency whose upper limit is at least 2,000 discharges per hour.

6. A combination as defined in claim 1, wherein said additive-supplying means comprises electromagnetic pump means including relay means energizable to initiate the discharge of a unit quantity of additive, said signal-generating means comprising switch means in series with said relay means and arranged to close in response to displacement of said rotor means through an angle of predetermined magnitude to thereby effect energization of said relay means, and further comprising control means including capacitor means in series with said relay means and said switch means to become charged in response to closing of said switch means and resistor means in parallel with said capacitor means and said relay means, the resistance of said resistor means being such that said relay means is energized in response to opening of said switch means and resulting discharge of said capacitor means through said resistor means.

7. A combination as defined in claim 6, wherein said control means further comprises second resistor means in series with said first-mentioned resistor means and second switch means arranged to bridge said second resistor means in closed position thereof, the combined resistance of said first-mentioned and second resistor means being such that said relay means is deenergized in response to opening of said first-mentioned switch means in open position of said second switch means.

* * * * *